May 26, 1931.     W. P. BOTT     1,806,870
AEROPLANE
Filed Nov. 12, 1929     3 Sheets-Sheet 1
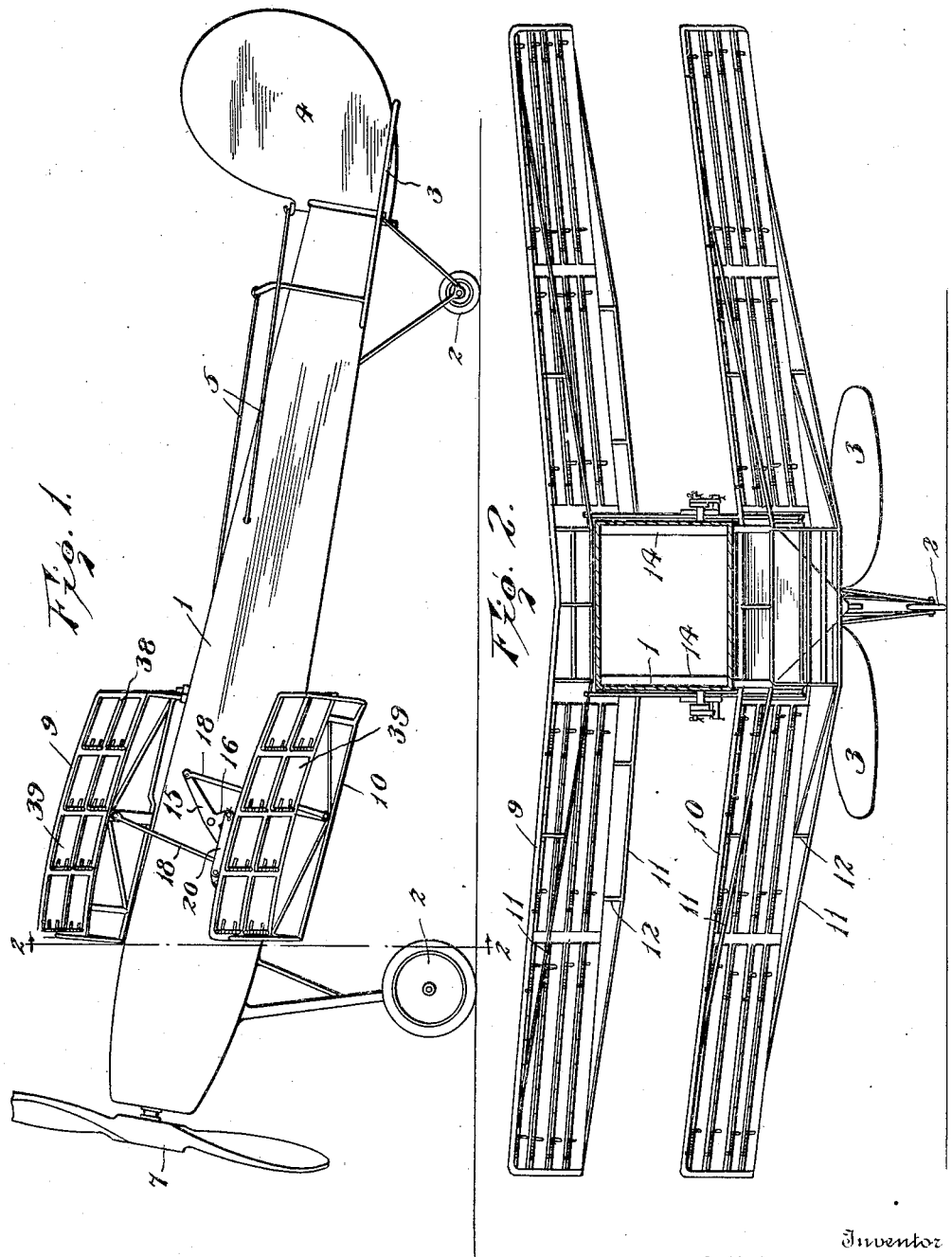
Inventor
W. P. Bott
By Lacey & Lacey, Attorneys May 26, 1931. W. P. BOTT 1,806,870
AEROPLANE
Filed Nov. 12, 1929 3 Sheets-Sheet 2
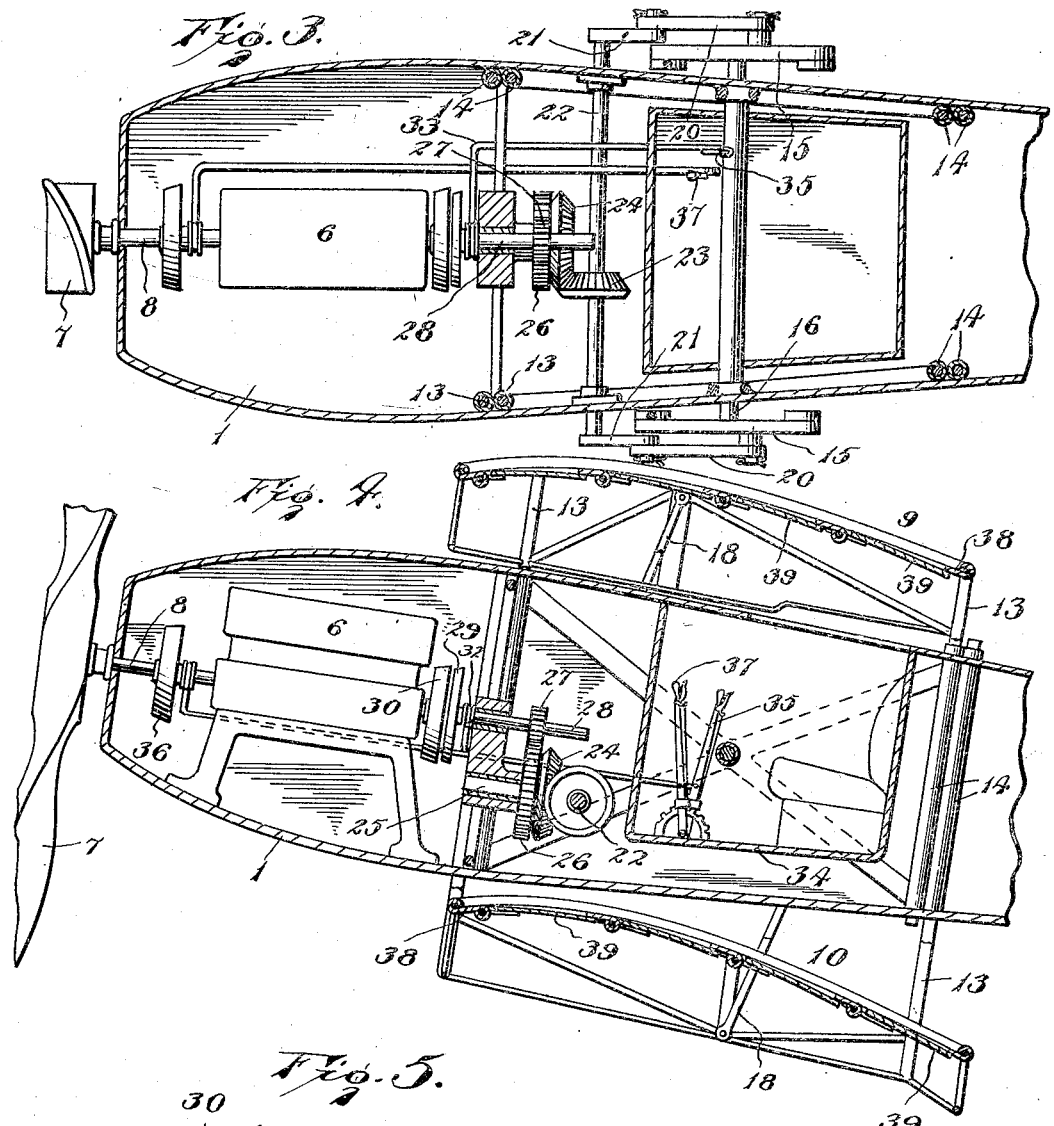
Inventor
W. P. Bott
By Lacey & Lacey,
Attorneys May 26, 1931.  W. P. BOTT  1,806,870
AEROPLANE
Filed Nov. 12, 1929  3 Sheets-Sheet 3
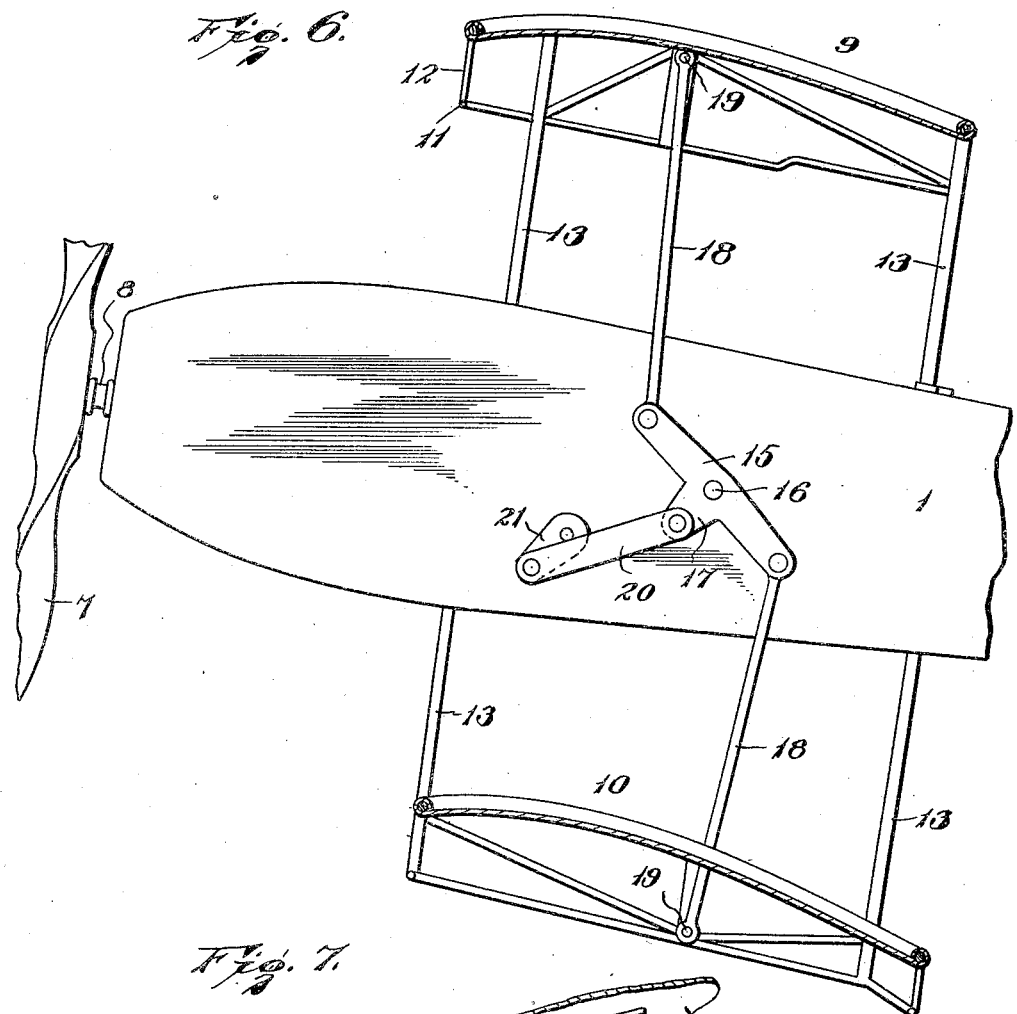
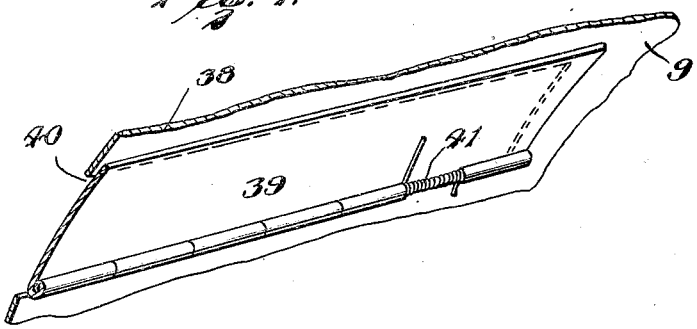
Inventor
W. P. Bott
By Lacey & Lacey, Attorneys Patented May 26, 1931

1,806,870

UNITED STATES PATENT OFFICE

WISTER P. BOTT, OF HOMER, LOUISIANA

AEROPLANE

Application filed November 12, 1929. Serial No. 406,653.

This invention relates to aeroplanes and has special reference to the construction of the wings, the object being to provide means whereby the wings may be vertically reciprocated at the beginning of a flight or during flight in order to facilitate ascent of the ship. The invention provides a novel construction of the wing and also provides novel means for mounting and operating the wings whereby they are caused to move toward and from the fuselage to attain the desired results. The invention is illustrated in the accompanying drawings and consists in certain novel features which will be hereinafter first fully described and then more particularly defined in the appended claim.

In the drawings:

Figure 1 is a side elevation of an aeroplane embodying the invention,

Fig. 2 is a transverse section on the line 2—2 of Fig 1,

Fig. 3 is a view, partly in plan and partly in horizontal section, of the forward portion of the fuselage on a larger scale, Fig. 4 is a view, partly in longitudinal vertical section and partly in side elevation, Fig. 5 is a detail section of a clutch which is employed, Fig. 6 is an enlarged side elevation of the front portion of the fuselage with the wings in section, and Fig. 7 is an enlarged detail perspective view of a portion of one of the wings.

The fuselage 1 may be of any known or approved form and is equipped with the usual landing wheels 2 and with the horizontal rudders 3 and vertical rudder 4 used in steering the plane and controlled by operating rods, indicated at 5, in the usual manner. Within the forward end of the fuselage is mounted a motor, shown conventionally at 6, and the shaft of said motor extends forwardly and rearwardly, as will be understood, the usual propeller 7 being secured on the front extremity of the motor shaft 8 at the front of the ship, as shown.

The wings, shown at 9 and 10, may be of any preferred material and are suitably reinforced and braced by struts 11 applied along the front and rear edges thereof and connected therewith by guys 12, as will be understood. The wings are carried by posts 13 provided at the front and rear edges or sides of both wings and located at the sides of the fuselage so as to pass through the top and bottom of the fuselage respectively and engage guide tubes 14 secured therein, said tubes extending vertically along the inner surfaces of the sides of the fuselage, as will be understood more particularly upon reference to Fig. 3. The posts 13 fit within the guide tubes 14 with a close running fit so that they will be positively guided in their movements and may operate easily at all times. Mounted upon the sides of the fuselage are three-armed levers 15 having two alined arms extending in opposite directions from their respective pivots 16 and having a shorter arm disposed at a right angle to the alined arms and extending in a general forward direction relative thereto, said shorter right angularly disposed arm being indicated at 17. Connecting rods 18 are pivoted to the free ends of the alined arms and extend respectively upwardly and downwardly therefrom to be pivotally connected to the structure of the respective wings at points in the bracing thereof, as indicated at 19. Inasmuch as the connecting rods are pivotally attached to the opposite ends of the lever, it will be seen at once that when the lever is rocked the connecting rods will move in opposite directions and the wings consequently will be reciprocated toward and from the fuselage in opposition to each other. To operate the levers and the wings, a link 20 extends forwardly from the end of each short arm 17 and is pivoted to a crank 21 on the end of a shaft 22 which extends transversely through the fuselage and has a beveled gear 23 secured thereon. This beveled gear 23 meshes with a similar gear 24 secured upon an intermediate shaft 25 which is mounted within the fuselage in front of the transverse shaft 22 in the illustrated arrangement and is also equipped with a spur gear 26 meshing with a pinion 27 carried upon a clutch shaft 28, the clutch shaft being slidably mounted in a suitable bearing within the fuselage and equipped at its front end with a clutch disk 29 adapted to engage a cooperating clutch disk 30 secured upon the rear end of the motor shaft. The clutch disk 29 has a hub 31 provided with an annular groove which is engaged by a fork 32 on the end of a shifting rod 33 which extends rearwardly into the cabin, indicated at 34, where it is connected with a hand lever 35 so that the pilot, when his judgment dictates, may open the clutch and thereby arrest the movement of the wings or may close the clutch and cause the wings to operate. A similar clutch mechanism, indicated at 36, is mounted at the front of the motor and controlled by a hand lever 37 in the cabin whereby the propeller may be stopped when desired. It is obviously desirable to shut off the propeller at times when making a landing, and after the plane has reached a desired height, of course, the continued reciprocation of the wings is no longer desired.

In order that the wings may effectually perform the function of assisting in the rising of the plane from the ground, they are constructed so as to define a plurality of rectangular frames 38 in each of which is mounted a valve 39. These valves consist of rectangular plates of sufficient rigidity to withstand the strain imposed thereon and at the same time of material light enough not to unduly augment the dead weight of the ship. These valves are hingedly mounted upon the wings along one edge of the respective openings 40 defined by the several frames 38 and spring-pressed, as shown at 41, whereby their free edges will be yieldably held against the under surface of the wing. It will now be understood that upon the upward movement of a wing the force of the air above the wing will cause the valves to open and as soon as this pressure is relieved the springs will close the valves so that instantly upon the wing stopping its upward movement and starting its downward movement the entire surface of the wing will be closed and, consequently, it will present a large supporting surface to the wind or air and by reason of the extra pressure exerted by the relative downward movement of the wing, a strong lifting force will be created so that the plane will quickly rise from the ground.

It will be readily noted that I have provided an exceedingly simple mechanism whereby the flight of an aeroplane will be more quickly started than has been heretofore possible and the plane may be quickly caused to seek a higher level after flying for a greater or less period if so desired. The clutches provided permit the relative movement of the wings to be stopped at any time and this stoppage may be effected simultaneously with or independently of stoppage of the propeller if the pilot so desires. Moreover, the propeller may be stopped without stopping the wings. The bracing of the wings may take any desired form and additional braces may extend from the sides of the wings to the posts 13 carrying the same and caused to operate within slots provided therefor in the sides of the fuselage and in the sides of the guiding tubes 14, as will be understood.

Having thus described the invention, I claim:

In an aeroplane, the combination with a fuselage, of wings mounted thereon, levers fulcrumed between their ends upon the sides of the fuselage and having two alined arms and a third arm extending forwardly from their fulcrums at a right angle to the alined arms, connecting rods pivoted to the opposite ends of the alined arms and to the upper and lower wings respectively, a shaft extending transversely through the fuselage, means for rotating said shaft, cranks on the ends of said shaft, and links connecting said cranks with the forwardly extending arms of the respective levers.

In testimony whereof I affix my signature.

WISTER P. BOTT. [L. S.]